W. F. BLOUNT.
DEVICE FOR MEASURING MILEAGE.
APPLICATION FILED AUG. 16, 1912.
1,087,432.
Patented Feb. 17, 1914.
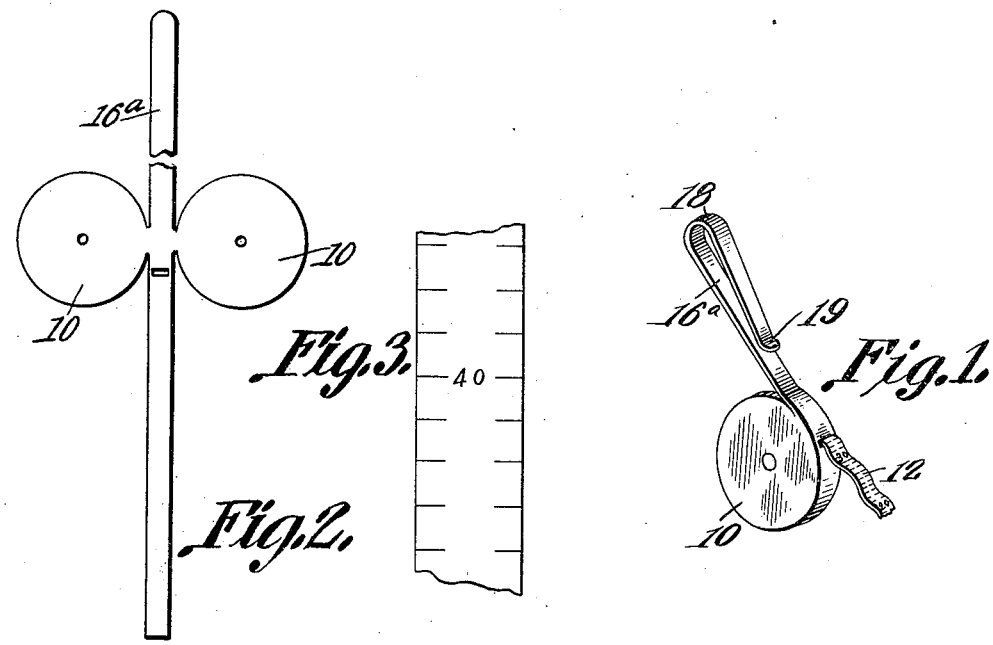
Witnesses
W. F. Blount,
Inventor
by C. A. Snow & Co.
Attorneys

UNITED STATES PATENT OFFICE.

WARREN FRANKLIN BLOUNT, OF FAYETTEVILLE, NORTH CAROLINA.

DEVICE FOR MEASURING MILEAGE.

1,087,432.  Specification of Letters Patent.  Patented Feb. 17, 1914.

Application filed August 16, 1912. Serial No. 715,462.

*To all whom it may concern:*

Be it known that I, WARREN F. BLOUNT, a citizen of the United States, residing at Fayetteville, in the county of Cumberland and State of North Carolina, have invented a new and useful Device for Measuring Mileage, of which the following is a specification.

The present invention relates to an improvement in devices for measuring railway mileage.

The primary object of the invention is to provide a device of this character which may be attached to the pocket or lapel of the coat of the conductor and which may be readily manipulated by one hand of the conductor, while the mileage book is held by the other.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings Figure 1 is a perspective view of the device. Fig. 2 is a detail view of the blank from which the device can be formed in a single piece. Fig. 3 is an enlarged detail of a portion of the tape.

In the drawings, 10 designates the casing, designed to house the tape 12, which is wound upon the usual form of spring drum in order that the same may be readily moved and returned to the casing. The tape is marked with a proper mileage gage in order that the conductor may place the terminal thereof at the edge of a mileage strip and accurately measure off the necessary amount of mileage. The casing 10 is provided with a clip 16ᵃ which is formed integral with the casing, this clip being a continuation of the periphery of the casing. The clip is bent upon itself at the point 18 and again bent at the point 19 in order that the same may be readily slipped over the lapel of the coat or into the pocket. The casing 10 is clipped to the coat of the conductor and it will thus be noted that the tape may be withdrawn and utilized to measure the mileage strip while the mileage is held by one hand of the conductor, the book and tape in this manner being conveniently manipulated, which would not be possible, were it necessary to hold the casing 10 with one hand and manipulate the tape and book with the other.

It will be noted that with a device of this character, the conductor may accurately and readily measure off the desired mileage, the spring drum readily returning the tape to the casing after the same has been used. It will be noted that various other forms of attaching devices may be employed, the essential feature being to support the mileage book in order that the conductor may conveniently manipulate the tape and book.

Particular attention is called to the fact that the clip and casing are formed integral, this providing a construction which may be easily and economically manufactured, the entire casing and clip being formed from a single piece of sheet metal.

What is claimed is:

A mileage measure comprising a casing, a measuring tape arranged within the casing, said casing being formed with an offset, said offset being bent to form a resilient retaining member.

In testimony that I claim the foregoing as my own, I have hereto affixed my signature in the presence of two witnesses.

WARREN FRANKLIN BLOUNT.

Witnesses:
J. VAUGHN,
E. L. HALL.

Copies of this patent may be obtained for five cents each, by addressing the "Commissioner of Patents, Washington, D. C."